(12) United States Patent
Kirby et al.

(10) Patent No.: US 9,073,793 B2
(45) Date of Patent: Jul. 7, 2015

(54) SLURRY COMPOSITIONS FOR MAKING ENVIRONMENTAL BARRIER COATINGS AND ENVIRONMENTAL BARRIER COATINGS COMPRISING THE SAME

(75) Inventors: Glen Harold Kirby, Cincinnati, OH (US); Brett Allen Boutwell, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 961 days.

(21) Appl. No.: 12/627,517

(22) Filed: Nov. 30, 2009

(65) Prior Publication Data

US 2011/0027556 A1 Feb. 3, 2011

Related U.S. Application Data

(60) Provisional application No. 61/230,354, filed on Jul. 31, 2009.

(51) Int. Cl.
| | |
|---|---|
| B32B 9/00 | (2006.01) |
| B32B 13/00 | (2006.01) |
| C04B 41/52 | (2006.01) |
| C04B 41/00 | (2006.01) |
| C04B 41/89 | (2006.01) |

(52) U.S. Cl.
CPC .......... *C04B 41/52* (2013.01); *Y10T 428/24967* (2015.01); *Y10T 428/24999* (2015.04); *C04B 41/009* (2013.01); *C04B 41/89* (2013.01)

(58) Field of Classification Search
CPC ........ C04B 41/52; C04B 41/009; C04B 41/89
USPC ................... 428/701, 702; 416/241 B, 241 R
See application file for complete search history.

(56) References Cited

U.S. PATENT DOCUMENTS

| | | | |
|---|---|---|---|
| 4,935,390 A | 6/1990 | Horiuchi et al. | |
| 5,294,576 A | 3/1994 | Mizushima et al. | |
| 5,759,932 A | 6/1998 | Sangeeta et al. | |
| 5,958,368 A | 9/1999 | Ryoo et al. | |
| 5,985,368 A * | 11/1999 | Sangeeta et al. ........... | 427/376.4 |
| 6,159,553 A | 12/2000 | Li et al. | |
| 6,294,261 B1 | 9/2001 | Sangeeta et al. | |
| 6,410,148 B1 | 6/2002 | Eaton, Jr. et al. | |
| 6,497,758 B1 | 12/2002 | Hasz et al. | |
| 6,617,037 B2 | 9/2003 | Sun et al. | |

(Continued)

FOREIGN PATENT DOCUMENTS

| | | | |
|---|---|---|---|
| JP | 6067601 A | 4/1985 | |
| JP | 09295872 A | 11/1997 | |

(Continued)

OTHER PUBLICATIONS

Non-Final Rejection towards corresponding U.S. Appl. No. 12/627,538 dated Apr. 17, 2014.

(Continued)

*Primary Examiner* — Jonathan Langman
(74) *Attorney, Agent, or Firm* — General Electric Company; William Scott Andes

(57) ABSTRACT

Slurry compositions for making an environmental barrier coating including from about 9 wt % to about 81 wt % water; from about 3 wt % to about 72 wt % primary material; and from about 0.1 wt % to about 18 wt % slurry sintering aid, and environmental barrier coatings including such compositions.

8 Claims, 5 Drawing Sheets

(56) References Cited

U.S. PATENT DOCUMENTS

| | | | |
|---|---|---|---|
| 6,677,064 | B1 | 1/2004 | Subramanian |
| 6,787,195 | B2 | 9/2004 | Wang et al. |
| 6,933,061 | B2 | 8/2005 | Nagarej et al. |
| 7,138,183 | B2 | 11/2006 | Hisamatsu et al. |
| 7,306,860 | B2 * | 12/2007 | Strangman et al. ........... 428/702 |
| 7,368,164 | B2 | 5/2008 | Stowell et al. |
| 7,422,671 | B2 | 9/2008 | Bhatia et al. |
| 8,673,400 | B2 | 3/2014 | Kirby et al. |
| 2003/0118440 | A1 * | 6/2003 | Zhao et al. .................... 415/118 |
| 2004/0028941 | A1 * | 2/2004 | Lane et al. .................... 428/689 |
| 2005/0025983 | A1 | 2/2005 | Willis et al. |
| 2006/0121295 | A1 | 6/2006 | Boutwell et al. |
| 2006/0280953 | A1 * | 12/2006 | Hazel et al. .................... 428/446 |
| 2006/0280954 | A1 | 12/2006 | Spitsberg et al. |
| 2006/0280963 | A1 | 12/2006 | Hazel et al. |
| 2007/0065672 | A1 | 3/2007 | Bhatia et al. |
| 2007/0207330 | A1 | 9/2007 | Tulyani et al. |
| 2009/0162533 | A1 | 6/2009 | Kirby et al. |
| 2009/0162561 | A1 | 6/2009 | Kirby et al. |
| 2009/0162632 | A1 | 6/2009 | Kirby et al. |
| 2009/0163606 | A1 | 6/2009 | Kirby et al. |
| 2009/0274850 | A1 * | 11/2009 | Bhatia et al. .................. 427/540 |
| 2010/0119718 | A1 | 5/2010 | Tulyani et al. |

FOREIGN PATENT DOCUMENTS

| | | |
|---|---|---|
| JP | 10183013 A | 7/1998 |
| JP | 2002173783 A | 6/2002 |
| JP | 2004277237 A | 10/2004 |
| JP | 2005200226 A | 7/2005 |
| JP | 2006052466 A | 2/2006 |
| JP | 2007229704 A | 9/2007 |
| JP | 2008074643 A | 4/2008 |
| JP | 2009149489 A | 7/2009 |
| JP | 2009149490 A | 7/2009 |
| JP | 2009149491 A | 7/2009 |
| JP | 2009149492 A | 7/2009 |
| WO | 2009085391 A2 | 7/2009 |

OTHER PUBLICATIONS

Non-Final Rejection towards corresponding U.S. Appl. No. 12/627,558 dated Jul. 29, 2014.

Unofficial English translation of Office Action issued in connection with corresponding JP Application No. 2010-168729 on Jul. 29, 2014.

Unofficial English translation of Office Action issued in connection with corresponding JP Application No. 2010-168744 on Sep. 16, 2014.

Unofficial English translation of Office Action issued in connection with corresponding JP Application No. 2010-169923 on Sep. 16, 2014.

Unofficial English translation of Office Action issued in connection with corresponding JP Application No. 2010-169924 on Sep. 16, 2014.

Unofficial English translation of Office Action issued in connection with corresponding JP Application No. 2010-170087 on Sep. 16, 2014.

* cited by examiner

SLURRY COMPOSITIONS FOR MAKING ENVIRONMENTAL BARRIER COATINGS AND ENVIRONMENTAL BARRIER COATINGS COMPRISING THE SAME

CROSS REFERENCE TO RELATED APPLICATIONS

This Application claims priority to U.S. Provisional Application Ser. No. 61/230,354, filed Jul. 31, 2009, which is herein incorporated by reference in its entirety.

STATEMENT OF GOVERNMENT RIGHTS

This invention was made, at least in part, with a grant from the Government of the United States (Contract No. N00019-04-C-0093, from the Department of the Navy). The Government may have certain rights to the invention.

TECHNICAL FIELD

Embodiments described herein generally relate to slurry compositions for making environmental barrier coatings and environmental barrier coatings comprising the same. More particularly, embodiments described herein generally relate to environmental barrier coatings that are made and densified using at least one sintering aid.

BACKGROUND OF THE INVENTION

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. While superalloys have found wide use for components used throughout gas turbine engines, and especially in the higher temperature sections, alternative lighter-weight component materials have been proposed.

Ceramic matrix composites (CMCs) are a class of materials that consist of a reinforcing material surrounded by a ceramic matrix phase. Such materials, along with certain monolithic ceramics (i.e. ceramic materials without a reinforcing material), are currently being used for higher temperature applications. These ceramic materials are lightweight compared to superalloys, yet can still provide strength and durability to the component made therefrom. Therefore, such materials are currently being considered for many gas turbine components used in higher temperature sections of gas turbine engines, such as airfoils (e.g. turbines, and vanes), combustors, shrouds and other like components, that would benefit from the lighter-weight and higher temperature capability these materials can offer.

CMC and monolithic ceramic components can be coated with environmental barrier coatings (EBCs) to protect them from the harsh environment of high temperature engine sections. EBCs can provide a dense, hermetic seal against the corrosive gases in the hot combustion environment, which can rapidly oxidize silicon-containing CMCs and monolithic ceramics. Additionally, silicon oxide is not stable in high temperature steam, but is converted to volatile (gaseous) silicon hydroxide species. Thus, EBCs can help prevent dimensional changes in the ceramic component due to such oxidation and volatilization processes. Unfortunately, there can be some undesirable issues associated with standard, industrial coating processes such as plasma spray and vapor deposition (i.e. chemical vapor deposition, CVD, and electron beam physical vapor deposition, EBPVD) currently used to apply EBCs.

Accordingly, there remains a need for environmental barrier coatings to protect CMCs from the high temperature steam environments present in gas turbine engines.

BRIEF DESCRIPTION OF THE INVENTION

Embodiments herein generally relate to slurry compositions for making an environmental barrier coating, the slurry composition comprising: from about 9 wt % to about 81 wt % water; from about 3 wt % to about 72 wt % primary material; and from about 0.1 wt % to about 18 wt % slurry sintering aid.

Embodiments herein also generally relate to environmental barrier coatings comprising: at least one transition layer made from a slurry composition comprising: from about 9 wt % to about 81 wt % water; from about 3 wt % to about 72 wt % primary transition material; and from about 0.1 wt % to about 18 wt % slurry sintering aid; and an outer layer made from a slurry composition comprising: from about 9 wt % to about 81 wt % water; from about 3 wt % to about 72 wt % primary outer material; and from about 0.1 wt % to about 18 wt % slurry sintering aid.

Embodiments herein also generally relate to environmental barrier coatings comprising: a bond coat layer comprising silicon; a silica layer; at least one transition layer made from a slurry composition comprising: from about 9 wt % to about 81 wt % water; from about 3 wt % to about 72 wt % primary transition material; and from about 0.1 wt % to about 18 wt % slurry sintering aid; and an outer layer made from a slurry composition comprising: from about 9 wt % to about 81 wt % water; from about 3 wt % to about 72 wt % primary outer material; and from about 0.1 wt % to about 18 wt % slurry sintering aid wherein the transition layer comprises a porosity of from about 0.01% to about 30% by volume of the transition layer, and the outer layer comprises a porosity of from about 0.01% to about 15% by volume of the outer layer.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to slurry compositions for making environmental barrier coatings and environmental barrier coatings comprising the same. More particularly, embodiments described herein generally relate to environmental barrier coatings that are made and densified using at least one sintering aid.

More specifically, the EBCs described herein below can comprise sintering aids, which can lower the sintering temperature, thereby promoting the formation of dense EBC layers that can act as a hermetic seal to protect the underlying component from corrosion from the gases generated during high temperature combustion without damaging the component through exposure to high sintering temperatures, as explained herein below.

The EBCs described herein may be suitable for use in conjunction with CMCs or monolithic ceramics. As used herein, "CMC" refers to silicon-containing matrix and reinforcing materials. Some examples of CMCs acceptable for use herein can include, but should not be limited to, materials having a matrix and reinforcing fibers comprising silicon carbide, silicon nitride, and mixtures thereof. As used herein, "monolithic ceramics" refers to materials comprising silicon carbide, silicon nitride, and mixtures thereof. CMCs and monolithic ceramics are collectively referred to herein as "ceramics."

As used herein, the term "barrier coating(s)" can refer to environmental barrier coatings. The barrier coatings herein may be suitable for application to "ceramic components," or simply "components," found in high temperature environments (e.g. operating temperatures of about 2500° C.), such as those present in gas turbine engines. Examples of such components can include, for example, combustor components, turbine blades, shrouds, nozzles, heat shields, and vanes.

Figure 1:
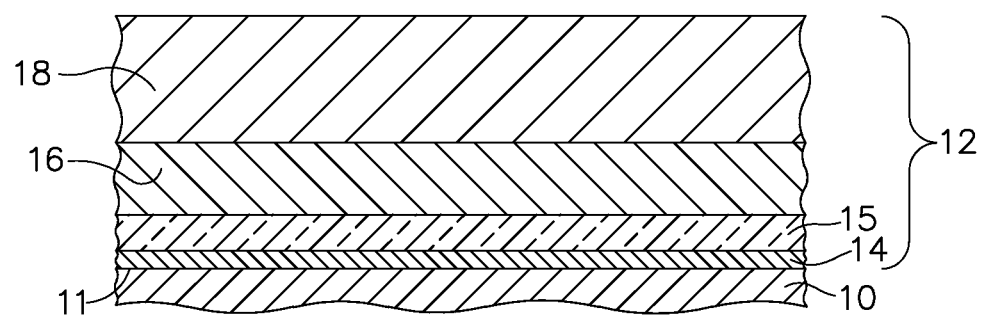
FIG. 1 is a schematic cross sectional view of one embodiment of an environmental barrier coating in accordance with the description herein.

More specifically, component 10 may comprise EBC 12, which can include a bond coat layer 14, an optional silica layer 15 adjacent to the bond coat layer, at least one transition layer 16 adjacent to bond coat layer 14 (or silica layer 15 if present), and an outer layer 18 adjacent to transition layer 16, as shown generally in FIG. 1. Bond coat layer 14 may comprise silicon and may generally have a thickness of from about 0.1 mils to about 6 mils. Due to the application method as described herein below, there may be some local regions where the silicon bond coat is missing, which can be acceptable. For example, in one embodiment, bond coat layer can cover about 100% of a surface 11 of component 10, and in another embodiment, about 90% or more of the surface of the component.

Silica layer 15 can have an initial thickness of from about 0.0 mils to about 0.2 mils, and the thickness of silica layer 15 can increase over time. Specifically, in one embodiment, the silicon of bond coat layer 14 can oxidize slowly during the service life of the EBC to gradually form silica layer 15. The oxidation of bond coat 14 can protect the underlying ceramic component from oxidation, since the bond coat is oxidized rather than the ceramic component. Alternately, as explained below, silica layer 15 can be applied using conventional methods to an initial thickness as described previously, and can again increase in thickness over time.

Transition layer 16 may include from about 85% to about 100% by volume of the transition layer of a primary transition material and up to about 15% by volume of the transition layer of a secondary material, and in one embodiment from about 85% to about 99% by volume of the transition layer of the primary transition material and from about 1% to about 15% by volume of the transition layer of the secondary material.

As used herein, "primary transition material" refers to mullite, BSAS, or a mixture of the two (hereafter "mullite/BSAS mixture"). The "mullite/BSAS mixture," also referred to as "a mixture of mullite and BSAS," can comprise from about 1% to about 99% by volume mullite and from about 1% to about 99% by volume BSAS, and in another embodiment, from about 70% to about 90% by volume mullite and from about 10% to about 30% by volume BSAS. As used herein throughout, "secondary material" refers to a rare earth oxide ($Ln_2O_3$), rare earth disilicates ($Ln_2Si_2O_7$), rare earth monosilicates ($Ln_2SiO_5$), a rare earth (Ln) element, a rare earth (Ln) containing aluminosilicate glass, a rare earth (Ln) and alkaline earth containing aluminosilicate glass, a rare earth aluminate (such as rare earth aluminum garnet ($Ln_3Al_5O_{12}$) and monoclinic rare earth aluminate ($Ln_4Al_2O_9$)), phosphorous pentoxide ($P_2O_5$), a phosphorous containing aluminosilicate glass, a phosphorous and alkaline earth containing aluminosilicate glass, aluminum orthophosphate ($AlPO_4$), aluminum oxide, and various mixtures thereof. In some embodiments, secondary materials can help make the coating more compliant and more likely to stick to the underlying ceramic component. In other embodiments, the secondary materials can contribute to improved resistance to calcium magnesium aluminum silicate (CMAS), or steam. In other embodiments, the secondary materials can be more steam recession resistant than the primary materials.

Each transition layer 16 may have a thickness of from about 0.1 mils to about 6.0 mils, and may be made and applied to bond coat layer 14 as set forth below. In one embodiment, there may be more than one transition layer present. In such instances, each transition layer may comprise the same or different combination of primary transition materials and secondary materials. Transition layer 16 may have a porosity level of from 0% to about 30% by volume of the transition layer, and in another embodiment, from about 0.01% to about 30% by volume of the transition layer.

As used herein throughout, "rare earth" or "Ln" refers to scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu), while "rare earth oxide" refers to $Sc_2O_3$, $Y_2O_3$, $La_2O_3$, $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$. "Alkaline earth" can include magnesium (Mg), calcium (Ca), strontium (Sr), and barium (Ba).

Similarly, outer layer 18 may include from about 85% to about 100% by volume of the outer layer of a primary outer material and up to about 15% by volume of the outer layer of the previously defined secondary material, and in one embodiment from about 85% to about 99% by volume of the outer layer of a primary outer material and from about 1% to about 15% by volume of the outer layer of the secondary material, though for any EBC, any secondary material present in the outer layer need not be the same secondary material as is present in the transition layer. As used herein, "primary outer material" refers to BSAS. Outer layer 18 may have a thickness of from about 0.1 mils to about 40 mils, and may be suitable for use in service at temperatures up to about 2500° F. (1371° C.). Outer layer 16 may have a porosity level of from 0% to about 15% by volume of the outer layer, and in another embodiment, from about 0.01% to about 15% by volume of the outer layer. In this way, the outer layer can help seal out high temperature steam, which can rapidly oxidize the underlying bond coat layer and ceramic component. Also, because the outer layer can seal out high temperature steam, it can protect the underlying ceramic component, or EBC layers, from volatilization since such materials may be prone to conversion to gaseous species in high temperature steam environments.

The layered EBC can be made and applied in accordance with the description herein below.

Bond coat layer 14 may be applied by plasma spray processes, chemical vapor deposition processes, electron beam physical vapor deposition processes, dipping in molten silicon, sputtering processes, and other conventional application processes known to those skilled in the art.

As previously described, in some embodiments, silica layer 15 can form during the service life of the EBC. More particularly, oxygen in the surrounding atmosphere can diffuse through the outer layer and transition layer(s) of the EBC and react with the silicon of bond coat layer 14 to form silica layer 15. Alternately, silica layer 15 may be intentionally deposited by chemical vapor deposition, plasma spray, slurry deposition, or other conventional method.

In the present embodiments, the manufacturing and application processes for transition layer 16 and outer layer 18 may consist of a slurry deposition cycle including sintering aids to lower the temperature needed to densify the layer. The slurry deposition cycle can generally include slurry formation, slurry application, drying, and sintering, with optional masking, leveling, sintering aid infiltration, mask removal, and organic processing aid burnout steps, as set forth below. Those skilled in the art will understand that slurries of varying composition can be used to make EBC layers of varying composition and that multiple slurry deposition cycles can be used to build up the total thickness of a particular layer (i.e., transition layer or outer layer). The average thickness per slurry deposition cycle depends primarily on the slurry solids loading, sintering aid concentration, and number of dip, spray, or paint passes.

The slurry composition for each of the transition and outer layers of the EBC can generally comprise a mixture including from about 9 wt % to about 81 wt % water; from about 3 wt % to about 72 wt % primary material; from about 0 wt % to about 6 wt % dispersant; from about 0 wt % to about 7 wt % plasticizer; from about 0 wt % to about 1 wt % surfactant; from about 0 wt % to about 18 wt % slurry sintering aid, and in one embodiment from about 0.1 wt % to about 18 wt % slurry sintering aid; from about 0 wt % to about 11 wt % secondary additive for controlled dispersion; from about 0 wt % to about 0.5 wt % thickener; and from about 0 wt % to about 15 wt % latex binder, as set forth herein below.

More specifically, as used herein, "primary material" refers to any of the previously defined primary transition materials or primary outer materials, depending on which layer is being formed. The primary material may comprise a powder having a particle size distribution of D50 of 0.2-2 microns and D95 of 10-30 microns. Such fine particle size distribution can sinter to a dense layer in a reasonable amount of time (i.e. less than about 24 hours). In an alternate embodiment, the distribution can be bimodal, wherein from about 0.1 vol. % to about 40 vol % of the primary material powder particles have a larger size described by the following distribution: D50 of 10-30 microns and D95 up to 100 microns. Having up to about 40% larger sized particles in a bimodal distribution will allows for the formation of thicker layers with each coating pass without rendering "sluggish" (i.e. greater than about 24 hours) sintering behavior.

As used herein, "dispersant" refers to compositions selected from the group consisting of polyacrylic acid, polyacrylic acid-polyethylene oxide copolymers, polymethacrylic acid, polyethylenimine, ammonium polyacrylate, ammonium polymethacrylate, sulfonated naphthalene formaldehyde condensate, polyvinyl sulfonic acid, and combinations thereof.

As used herein, "plasticizer" refers to compositions selected from the group consisting of ethylene glycol, diethylene glycol, triethylene glycol, tetraethylene glycol glycerol, glycerin, polyethylene glycol, diethylene glycol monobutyl ether, and combinations thereof.

As used herein, "surfactant" refers to compositions selected from the group consisting of fluorocarbons, dimethylsilicones, and acetylenic glycol chemistries (e.g. commercial surfactants in the Surfynol® series (Air Products and Chemicals, Inc.)).

As used herein, "slurry sintering aid" refers to sintering aid compositions suitable for inclusion in the slurry that can be selected from the group consisting of a rare earth nitrate, rare earth acetate, rare earth chloride, rare earth oxide, ammonium phosphate, phosphoric acid, polyvinyl phosphonic acid, and combinations thereof.

As used herein, "secondary additive for controlled dispersion" refers to compositions selected from the group consisting of citric acid, glycine, dextrose, sucrose, mannose, tartaric acid, oxalic acid, and combinations thereof.

As used herein, "thickener" refers to compositions selected from the group consisting of xanthan gum, polyethylene oxide, guar gum, methylcellulose and other soluble fiber, polyacrylic acid, polyvinylpyrolidone, and combinations thereof.

As used herein, "latex binder" refers to compositions selected from the group consisting of polystyrene, polyvinyl alcohol, polyvinyl butyrol, styrene-butadiene copolymer, polyacrylic acid, polyacrylates, acrylic polymers, polymethyl methacrylate/polybutyl acrylate, polyvinyl acetate, polyvinyl malate, and natural latex rubber. Some examples of latex binders can include Rhoplex® HA-8, Rhoplex® HA-12, Pavecryl® 2500 (Rohm and Haas).

Also, as used herein, "organic processing aids" refers to any dispersants, plasticizers, secondary additives for controlled dispersion, thickeners, and latex binders present in the slurry. These organic processing aids are comprised primarily of carbon and other elements that volatilize during processing such that they are not present in the post-sintered coating.

In one embodiment, the slurry can be formed by combining any water, dispersant, primary material, surfactant, and plasticizer desired with mixing media in a container for from about 3 hours to about 15 hours. The mixture can be mixed using conventional techniques known to those skilled in the art such as shaking with up to about a 0.039 inch (1 mm) to 0.25 inch (6.35 mm) diameter alumina or zirconia mixing media, ball milling using about a 0.25 inch to about a 1 inch (about 6.35 mm to about 25.4 mm) diameter alumina or zirconia mixing media, attritor milling using about a 1 mm to about a 5 mm diameter zirconia-based mixing media, planetary ball milling using from about a 1 mm to about a 5 mm diameter zirconia-based media, or mechanical mixing or stirring with simultaneous application of ultrasonic energy. The mixing media or ultrasonic energy can break apart any agglomerated ceramic particles in the slurry. Any mixing media present may subsequently be removed by straining, for example.

Thickener may be added to the slurry if desired and the resulting mixture may be agitated by such methods as mechanical stirring, rolling, blending, shaking, and other like methods. Once the thickener is fully dissolved, generally after about 5 minutes to about 60 minutes, any secondary additive for controlled dispersion can be added if desired, and the resulting slurry may again be mixed using any of the above listed methods until the secondary additive dissolves, which again can be after from about 5 minutes to about 60 minutes. The addition of sintering aid may follow if desired, along with mixing using the previously described methods until the sintering aid dissolves, which can take from about 5 minutes to about 60 minutes. The latex binder may then be added if desired, and the slurry may be mixed by slow rolling, slow mechanical mixing, or other like methods to avoid trapping air bubbles in the slurry. This light mixing can be continued indefinitely, or alternately, once mixed, the slurry can be set aside until needed for application. In one embodiment, the slurry may be refreshed by adding additional water to account for that which has evaporated during processing.

Those skilled in the art will understand that the previous embodiment is one method for making the slurry compositions described herein, and that other methods are also acceptable, as set forth in the Examples below.

If desired, masking can be applied to the ceramic component before the slurry is applied to prevent coating specific areas of the component. Masking may be accomplished using conventional techniques known to those skilled in the art including, but not limited to, tapes, tooling, and paint-on adhesives.

Once all desired masking of the ceramic component is complete, the slurry can be applied to produce a coated component. The slurry can be applied directly to the ceramic component using any conventional slurry deposition method known to those skilled in the art, including but not limited to, dipping the component into a slurry bath, or painting, rolling, stamping, spraying, or pouring the slurry onto the component. In one embodiment, slurry application can be carried out in a humid environment to help prevent water evaporation that could change the slurry rheology, for example, during coating deposition onto a large batch of parts. In one embodiment, the environment can comprise greater than 50% relative humidity, in another embodiment greater than 70% relative humidity, and in yet another embodiment greater than 95% relative humidity, all at or near room temperature (about 20° C. to about 30° C.). Slurry application can be carried out manually or it may be automated.

Once the slurry has been applied to the ceramic component, and while the slurry is still wet, it may be leveled to remove excess slurry material. Leveling may be carried out using conventional techniques such as, but not limited to, spinning, rotating, slinging the component, dripping with or without applied vibration, or using a doctor blade, to remove excess slurry material. Similar to slurry application, leveling can be conducted manually or it may be automated, and it can be carried out in a humid environment because if the slurry dries too quickly, it can lead to defects in the coating during leveling.

Next, the coated component can be dried. Drying may be carried out in ambient or controlled temperature and humidity conditions. In one embodiment, controlled temperature and humidity can be utilized to help maintain the integrity of the applied slurry coating. More particularly, in one embodiment, drying may be carried out at temperatures of from about 5° C. to about 100° C., and in another embodiment, from about 20° C. to about 30° C., and in an environment comprising from about 10% relative humidity to about 95% relative humidity, in one embodiment from about 50% relative humidity to about 90% relative humidity, and in yet another embodiment from about 70% relative humidity to about 80% relative humidity.

After drying, any masking present may be removed by peeling off tapes and adhesives, pyrolysis of tapes and adhesives, or by removing multi-use tooling. Any rough edges remaining after masking removal may be scraped or cut away using conventional means.

Next, burnout of the organic processing aids may be carried out by placing the dried component in an elevated temperature environment so that any bound water can be evaporated and the organic processing aids can be pyrolyzed. In one embodiment, burnout of the organic processing aids may be accomplished by heating the dried component at a rate of from about 1° C./min to about 15° C./min to a temperature of from about 400° C. to about 1000° C. and holding the component at this temperature for from about 0 to about 2 hours. In another embodiment, the coated component may be heated at a rate of from about 2° C./min to about 6° C./min to a temperature of from about 600° C. to about 800° C. and holding the component at this temperature for from about 0 to about 2 hours. In another embodiment, the hold time can be eliminated by slowly ramping up to the target temperature without holding, followed by ramping up or down to another temperature at a different rate. In another embodiment, binder burnout can occur rapidly by placing the coated component into a furnace heated to a temperature of from about 400° C. to about 1400° C.

The dried component may then be sintered to produce a component comprising an environmental barrier coating. Sintering can serve to simultaneously densify and impart strength to the coating. Additionally, in the case of the outer layer of the EBC, sintering can impart a hermetic seal against high temperature steam present in the engine environment. Sintering can be carried out using a conventional furnace, or by using such methods as microwave sintering, laser sintering, infrared sintering, and the like.

Sintering can be accomplished by heating the dried component at a rate of from about 1° C./min to about 15° C./min to a temperature of from about 1100° C. to about 1700° C. and holding the component at that temperature for from about 0 to about 24 hours. In another embodiment, sintering can be accomplished by heating the coated component at a rate of from about 5° C./min to about 15° C./min to a temperature of from about 1300° C. to about 1375° C. and holding the component at that temperature for from about 0 to about 24 hours.

Alternately, in another embodiment, binder burnout and sintering can be carried out in a single process by heating at a rate of about 1° C./minute to about 15° C./minute to a temperature of from about 400° C. to about 1000° C. and holding at this temperature for from about 0 to about 2 hours. The component can then be heated at a rate of from about 1° C./minute to about 15° C./minute from the binder burnout temperature to from about 1100° C. to about 1700° C. and holding at his temperature for from about 0 to about 24 hours, as set forth in the Examples below.

In an alternate embodiment, all layers of the EBC can be applied, one on top of the other, before masking removal, organic processing aid burnout, and sintering are carried out. Those skilled in the art will understand that after application of each layer, the layer should be at least partially dried before application of the subsequent layer.

In another embodiment, the sintering aid does not need to be added directly to every layer of the slurry to achieve the desired result. For example, in one embodiment, a slurry comprising at least the primary transition material of mullite, or a mullite/BSAS mixture, with no sintering aid may be applied to the ceramic component as a transition layer, dried, and sintered in either a vacuum, an inert atmosphere, or a reducing atmosphere (argon, argon 4% hydrogen, nitrogen, etc.). Next, a BSAS (primary outer material) slurry containing a sintering aid can be applied as the outer layer. Upon drying and sintering the outer layer, the sintering aid from the BSAS outer layer can diffuse into the transition layer to form secondary materials. Alternately, the transition layer slurry can comprise the sintering aid while the outer layer slurry does not. In this instance, during sintering the sintering aid can diffuse from the transition layer to the outer layer. In another embodiment, a primary material slurry with no sintering aid can be densified by applying the layer, allowing it to dry, and then back infiltrating a sol-gel solution comprised of a water soluble or solvent soluble sintering aid prior to heat treatment as explained below.

Infiltration of a sol-gel solution may be useful as some of the rare earth-containing and phosphorous-containing sintering aids can be difficult to mix into the previously described water-based slurry. Infiltration may also allow for the densification of a thicker layer of EBC material at one time. Moreover, infiltration is also a way to add more sintering aid after sintering if the coating isn't as dense as desired. The sol-gel solution used for infiltration may be an aqueous solution of a "water soluble sintering aid" selected from the group consisting of a rare earth nitrate, a rare earth acetate, a rare earth chloride, phosphoric acid, ammonium phosphate, ammonium phosphate dibasic, ammonium phosphate monobasic, or polyvinyl phosphoric acid. In another embodiment, the sol-gel solution may comprise a solution of organic solvent and a "solvent soluble sintering aid." As used herein, "solvent soluble sintering aid" refers to a "solvent soluble rare earth source," or a "solvent soluble phosphorous source," as defined herein below.

As used herein, "organic solvent" refers to solvents including, but not limited to, methyl alcohol, ethyl alcohol, isopropanol, butyl alcohol, pentanol, hexanol, heptanol, octanol, glycerol, glycerin, polyethylene glycol, ethylene glycol, acetone, toluene, xylene, heptane, methyl isobutyl ketone (MIBK), ethylbenzene, propylbenzene, heptane, octane, nonane, decane, and mixtures thereof.

As used herein, "solvent soluble rare earth source" refers to, but is not limited to, a rare earth acetate, a rare earth oxalate, a rare earth isopropoxide, a rare earth methoxyethoxide, rare earth 2,2,6,6-tetramethyl-3,5-heptanedionate, rare earth 2,4-pentanedionate, rare earth acetylacetonate, and mixtures thereof.

As used herein "solvent soluble phosphate source" refers to, but is not limited to, polyvinyl phosphoric acid; tributyl phosphate; trimethyl phosphate; triethyl phosphate; tripropyl phosphate; urea phosphate salt; mono-methyl phosphate bis (cyclohexylammonium) salt; dimethyl phosphate; 2-aminoethyl dihydrogen phosphate; phospho(enol)pyruvic acid cyclohexylammonium salt; trimethyl phosphate; diethyl phosphate; anilinium hypophosphite; 4-ethyl-2,6,7-trioxa-1-phosphabicyclo[2.2.2]octane; phytic acid; diethyl allyl phosphate; spermidine phosphate salt hexahydrate; dibutyl phosphate; tetraethyl pyrophosphate; triisopropyl phosphate; 1-naphthyl phosphate; bis(4-nitrophenyl)phosphate; spermine diphosphate salt; diphenyl phosphate; 2,4-diamino-6,7-diisopropylpteridine phosphate salt; cyclohexylammonium phosphate dibasic; tributyl phosphate; tridecyl phosphate; dibenzyl phosphate; bis(2-ethylhexyl)phosphate; triphenyl phosphate; triphenyl phosphate; tris(2-butoxyethyl)phosphate; tricresyl phosphate; hydroxypyruvic acid dimethyl ketal phosphate tri(cyclohexylammonium) salt; tris(2-ethylhexyl)phosphate; tetrabenzyl pyrophosphate; {3,9-Bis(2,4-dicumylphenoxy)-2,4,8,10-tetraoxa-3,9-diphosphaspiro [5.5]undecane}; or mixtures thereof.

As used herein, "sintering aid(s)" refers to any of a "slurry sintering aid," a "water soluble sintering aid," or "a solvent soluble sintering aid," as defined previously. Without intending to be limited by theory, the inclusion of sintering aids to the EBC embodiments herein can increase the rate of diffusion of the primary material such that surface area reduction (i.e. high surface area particles consolidating to form a dense coating) can occur at lower temperatures than it would have absent the sintering aid. As previously described, sintering at lower temperatures (i.e. about 1375° C. or below) can not only result in a highly dense (i.e. greater than about 70% for the transition layer and greater than about 85% for the outer layer) coating that can be less susceptible to the penetration of hot steam from the engine environment, but can also help prevent the degradation of the mechanical properties of the underlying component that could result from prolonged exposure to higher temperatures.

Sintering aids can act in a variety of ways depending on the amount of sintering aid included in the EBC and the time at which the coating is exposed to sintering temperatures. For example, in one embodiment, the sintering aid can dissolve completely into the primary material (i.e. primary transition materials or primary outer materials). In another embodiment, if the amount of sintering aid that is soluble in the primary material is exceeded, the remaining insoluble portion of sintering aid can react with the primary material to form the secondary material (i.e. secondary transition material or secondary outer material). In another embodiment, primary material and secondary material can be present as described previously, along with residual sintering aid. In these latter two embodiments, when the secondary material is highly volatile in high temperature steam, such as aluminum phosphate, as long as the total volume of secondary material, plus porosity (plus residual sintering aid when present) in the outer layer of the EBC remains about 15% or less, the hermetic seal can be maintained. Alternately, in these latter two embodiments, when the secondary material is highly resistant to volatilization in high temperature steam, such as when the secondary material comprises a rare earth disilicate, rare earth monosilicate, or rare earth aluminate, then only the porosity in the outer layer of the EBC need remain about 15% or less to maintain the hermetic seal.

It should be noted that at low levels of sintering aid, the densified coating layer might not initially include any detectable secondary materials. In some embodiments, the secondary materials may never become detectable. In other embodiments, however, after hours of exposure to high temperature steam in the engine environment, the secondary materials can become detectable using techniques such as x-ray diffraction, electron microscopy, electron dispersive spectroscopy, and the like.

EBC embodiments described herein can offer a variety of benefits over current EBCs and manufacturing processes thereof. Specifically, as previously described, the inclusion of a sintering aid in the EBC embodiments herein can permit sintering at lower temperatures (i.e. about 1357° C. or below). This can result in a highly dense (i.e. greater than about 70% for the transition layer and greater than about 85% for the outer layer) coating that can be less susceptible to the penetration of hot steam from the engine environment, and can also help prevent the degradation of the mechanical properties of the underlying component that could result from prolonged exposure to higher temperatures. Also, the embodiments set forth herein can be made at less expense than current EBCs due to the use of the slurry deposition process, which is made possible by the incorporation of sintering aids into the various layers. Moreover, the present embodiments can provide for EBCs having a more uniform thickness than conventional techniques, such as plasma spraying, even when applying thin layers (<2 mils). The slurry deposition process can allow for the application of the EBCs to internal component passages as well as the ability to produce smooth surface finishes without an additional polishing step.

There can be occasions when the EBC develops small and/or narrow defects (e.g. about 10 microns to about 5 mm in diameter; or about 10 microns to about 1 mm in width) that need to be repaired. The following repair processes are applicable to the EBCs described herein and may be carried out after sintering of an individual EBC layer, or after sintering the entire applied EBC, as explained herein below.

In one embodiment, repairs may include remedying defects in one or more individual layers as the EBC is being applied using the methods described herein. In this embodiment, the repair can be carried out after sintering a given layer by applying a repair slurry comprising the same slurry materials used to make the layer having the defects. For example, if the transition layer develops a defect after sintering, the defect could be repaired using a "transition layer repair slurry" that comprises the same transition layer slurry materials used in the original application of the transition layer. In one embodiment, the repair slurry can comprise a higher solids loading of primary material ceramic particles than the original slurry layer as this can reduce shrinkage on drying and sintering of the repaired portion of the coating. In particular, the solids loading of primary material ceramic particles in the repair slurry can be greater than about 30% to about 55% by volume (as opposed to greater than about 10% by volume in one embodiment of the original slurry, and from about 10% to about 55% by volume in another embodiment of the original slurry used to make the layer). The repair slurry may be applied using any conventional method including those described previously, and the resulting "repair(ed) coating" may then be processed as described previously herein before application of any subsequent layer of the EBC.

In an alternate embodiment, repairs may include fixing defects after application and sintering of the entire EBC. In this embodiment, the repair may be carried out on the EBC having defects using an outer layer repair slurry comprising the same materials present in the previously defined outer layer slurry (i.e. primary outer material, a sintering aid, and optionally secondary material). This particular repair slurry can seep into any defects present in the EBC and provide a hermetic seal to the repaired EBC coating after sintering. Again, the solids loading of the outer layer repair slurry may comprise upwards of about 30% to 55% by volume.

Additionally, repair processes may be used to reduce surface roughness of a plasma sprayed EBC having any composition. Specifically, if the surface roughness of a plasma sprayed EBC is unacceptable the coating can be smoothed over by applying the previously described outer layer repair slurry. When applied over the plasma sprayed EBC, the outer layer repair slurry can fill in any gaps, grooves, or uneven portions of the plasma sprayed coating and reduce the surface roughness to an acceptable degree. More specifically, depending on the thickness of the outer layer repair slurry, surface roughness of the plasma sprayed EBC can be reduced from greater than 200 micro inch Ra, to between 40 micro inch Ra and 200 micro inch Ra in one embodiment, and from between 40 micro inch Ra to 150 micro inch Ra in another embodiment. In one embodiment, the outer layer repair slurry comprises a thickness of at least about 0.5 mils, and in another embodiment from about 0.5 mils to about 3 mils. The primary outer material solids loading for surface roughness improvement can be greater than about 10% to about 55% by volume in one embodiment, and from about 30% to about 55% by volume in another embodiment. The applied outer layer repair slurry can then be processed as described previously to produce a repaired EBC having an acceptable surface roughness.

Such repair processes can provide the ability to repair localized defects, at varying points during the application or life of the coating, as opposed to stripping off and reapplying the entire coating. This, in turn, can result in a savings of time, labor, and materials.

EXAMPLES

Example 1

A silicon bond coat was applied to a SiC—SiC CMC using a conventional air plasma spray process. Next, a primary transition material slurry was made by first mixing mullite, BSAS, water, polyacrylic acid, Surfynol 502®, and glycerin in a plastic container, along with enough 0.25 inch (6.35 mm) diameter, cylindrical alumina media to line the bottom of container. This mixture was placed on a roller mill for 15 hours. After taking the container off of the roller mill, the alumina media was removed. Xanthan gum was then added and the mixture was shaken for 15 minutes using a paint shaker. Finally, Rhoplex® HA8 emulsion was added and the container was placed back onto the roller mill for 1 hour (without media).

The resulting primary transition material slurry (Slurry A) consisted of 40.68% mullite, 10.17% BSAS, 2.54% polyacrylic acid, 0.14% Surfynol 502®, 0.23% xanthan gum, 6.71% Rhoplex® HA8 emulsion, 4.92% glycerin, and the balance water (all percents by weight). No sintering aid was added to this slurry. The silicon-coated ceramic component was dipped into Slurry A, dried in ambient conditions, and heat-treated at 3° C./minute to 1000° C. to burn out the binder. Then, the component was sintered by heating the component at 5° C./minute from 1000° C. to 1344° C. and holding for 5 hours to form a transition layer comprising a mullite/BSAS mixture (80 vol % mullite and 20 vol % BSAS). The entire heat treatment was carried out in a vacuum. The heating environment resulted in the mullite/BSAS transition layer having a porosity of less than 10% by volume.

Next, a primary outer material slurry was made by first mixing BSAS, water, polyacrylic acid, Surfynol 502®, and glycerin in a plastic container, along with enough 0.25 inch (6.35 mm) diameter, cylindrical alumina media to line the bottom of container. This mixture was placed on a roller mill for 15 hours. After taking the container off of the roller mill, the alumina media was removed. Next, glycine, xanthan gum, and yttrium nitrate hexahydrate were added and the mixture was shaken for 15 minutes using a paint shaker. Finally, Rhoplex® HA8 emulsion was added and the container was placed back onto the roller mill for 1 hour (without media).

The resulting primary outer material slurry (Slurry B) consisted of 49.49% BSAS, 1.84% yttrium nitrate hexahydrate (slurry sintering aid), 2.47% polyacrylic acid, 4.91% glycine, 0.13% Surfynol® 502, 6.36% Rhoplex® HA8 emulsion, 4.34% glycerin, and the balance water (all percents by weight). The SiC—SiC CMC with bond coat and transition layer was dipped into Slurry B, dried in ambient conditions, and heat-treated at 3° C./minute to 1000° C. to burn out the binder. Then, the component was sintered by heating the component at 5° C./minute from 1000° C. to 1344° C. and holding for 5 hours to form a densified outer layer. The entire heat treatment was carried out in ambient conditions. The Slurry B coating process and heat treatment were then repeated one time to increase the thickness of the outer layer.

The outer layer had a porosity of less than 10% by volume due to the yttrium nitrate slurry sintering aid in Slurry B.

Figure 2:
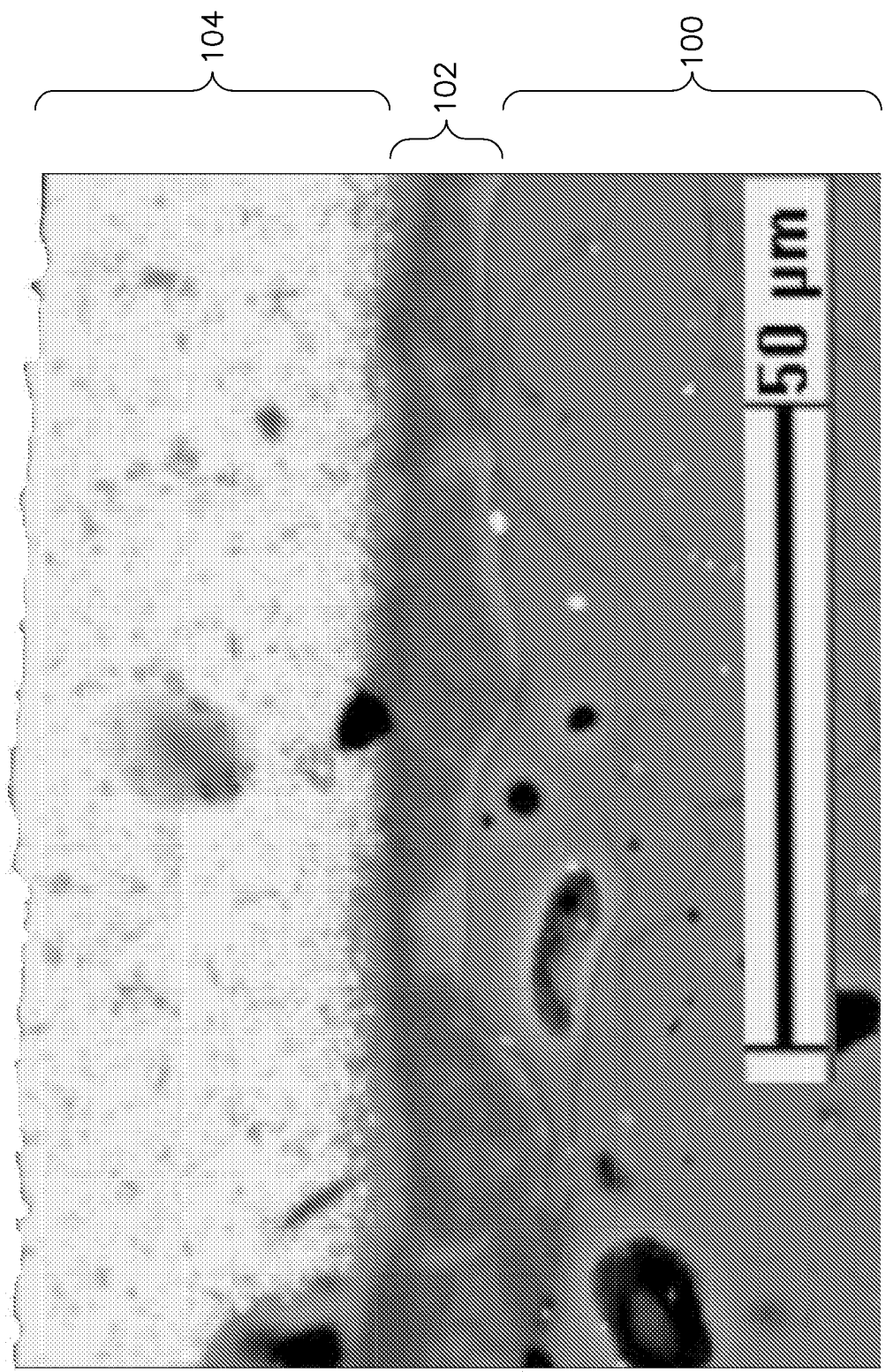
FIG. 2 is a SEM cross-section of an EBC coating on a SiC—SiC CMC in accordance with Example 1.

FIG. 2. shows a SEM micrograph of this coating microstructure with the air plasma spray silicon bond coat (100), transition layer (102), and outer layer (104). While the outer layer and transition layer appeared to consist mainly of the primary materials (BSAS and mullite/BSAS mixture, respectively), x-ray diffraction suggested that there was a secondary material present in the EBC, i.e., yttrium disilicate. Combined x-ray diffraction and EDS analysis suggested that there were small amounts of rare earth aluminosilicate glass and alkaline earth aluminosilicate glass secondary materials in the outer layer as well.

Example 2

A silicon bond coat was applied to a SiC—SiC CMC by a conventional air plasma spray process. Next, a primary transition material slurry was made by first mixing mullite, BSAS, water, polyacrylic acid, Surfynol 502®, and glycerin in a plastic container, along with enough 0.25 inch (6.35 mm) diameter, cylindrical alumina media to line the bottom of container. This mixture was placed on a roller mill for 15 hours. After taking the container off of the roller mill, the alumina media was removed. Xanthan gum and ammonium phosphate monobasic were then added and the mixture was shaken for 15 minutes using a paint shaker. Finally, Rhoplex® HA8 emulsion was added and the container was placed back onto the roller mill for 1 hour (without media).

The resulting primary transition material slurry (Slurry C) consisted of 34.07% mullite, 8.52% BSAS, 4.51% ammonium phosphate monobasic (slurry sintering aid), 2.13% polyacrylic acid, 0.16% Surfynol® 502, 0.29% xanthan gum, 5.62% Rhoplex® HA8 emulsion, 2.56% glycerin, and the balance water (all percents by weight). The silicon-coated ceramic component was dipped into Slurry C, dried in ambient conditions, and heat-treated at 3° C./minute to 1000° C. to burn out the binder. Then, the component was sintered by heating the component at 5° C./minute from 1000° C. to 1344° C. and holding for 5 hours to form a densified transition layer comprising a mullite/BSAS mixture (80 vol % mullite and 20 vol % BSAS). The entire heat treatment was carried out in ambient conditions. The densified transition layer had a porosity of less than 10% by volume due to the ammonium phosphate monobasic slurry sintering aid in Slurry C.

Next, a primary outer material slurry was made by first mixing BSAS, water, polyacrylic acid, Surfynol 502®, and glycerin in a plastic container, along with enough 0.25 inch (6.35 mm) diameter, cylindrical alumina media to line the bottom of the container. This mixture was placed on a roller mill for 15 hours. After taking the container off of the roller mill, the alumina media was removed. Xanthan gum and ammonium phosphate monobasic were then added and the mixture was shaken for 15 minutes using a paint shaker. Finally, a Rhoplex® HA8 emulsion was added and the container was placed back onto the roller mill for 1 hour (without media).

The resulting primary outer material slurry (Slurry D) consisted of 50.55% BSAS, 1.60% ammonium phosphate monobasic (slurry sintering aid), 2.53% polyacrylic acid, 0.13% Surfynol® 502, 0.25% xanthan gum, 6.50% Rhoplex® HA8 emulsion, 5.91% glycerin, and the balance water. The SiC—SiC CMC with bond coat and transition layer was dipped into Slurry D, dried in ambient conditions, and heat-treated at 3° C./minute to 1000° C. to burn out the binder. Then, the component was sintered by heating the component at 5° C./minute from 1000° C. to 1344° C. and holding for 5 hours to form a densified outer layer. The entire heat treatment was carried out in ambient conditions. The Slurry D coating process and heat treatment were then repeated to increase the thickness of the outer layer. The densified outer layer had a porosity of less than 10% by volume due to the ammonium phosphate monobasic slurry sintering aid in Slurry D.

Figure 3:
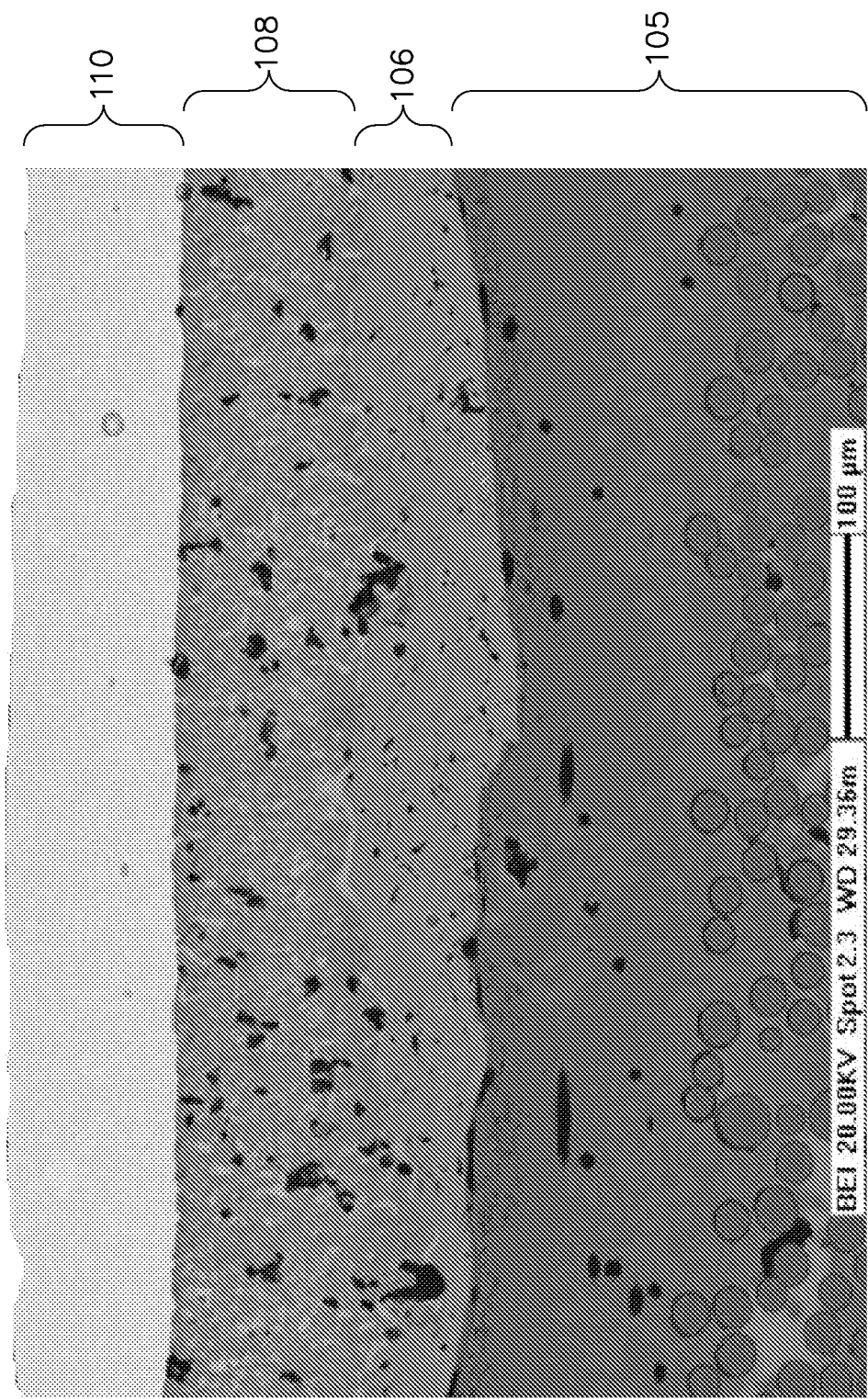
FIG. 3 is a SEM cross-section of an EBC coating on a SiC—SiC CMC in accordance with Example 2.

FIG. 3 shows a SEM micrograph of a CMC (105) having this coating microstructure with the air plasma spray silicon bond coat (106), transition layer (108), and outer layer (110). While the outer layer and transition layer appeared to consist of the primary materials (BSAS and mullite/BSAS mixture, respectively), x-ray diffraction suggested that there were secondary materials present, including aluminum oxide, and yttrium aluminate ($Y_3Al_5O_{12}$).

Example 3

A silicon bond coat was applied to a SiC—SiC CMC using a conventional air plasma spray process. Next, a primary transition material slurry was made by first mixing mullite, BSAS, water, polyacrylic acid, Surfynol 502®, and glycerin in a plastic container, along with enough 0.25 inch (6.35 mm) diameter, cylindrical alumina media to line the bottom of container. This mixture was placed on a roller mill for 15 hours. After taking the container off of the roller mill, the alumina media was removed. Glycine, xanthan gum, and yttrium nitrate hexahydrate were then added and the mixture was shaken for 15 minutes using a paint shaker. Finally, a Rhoplex® HA8 emulsion was added and the container was placed back onto the roller mill for 1 hour (without media).

The resulting primary transition material slurry (Slurry E) consisted of 32.23% mullite, 8.06% BSAS, 8.04% yttrium nitrate hexahydrate (slurry sintering aid), 2.01% polyacrylic acid, 5.55% glycine, 0.15% Surfynol® 502, 0.10% xanthan gum, 5.31% Rhoplex® HA8 emulsion, 3.63% glycerin, and the balance water (all percents by weight). The silicon-coated ceramic component was dipped into slurry E, dried in ambient conditions, and heat-treated at 3° C./minute to 1000° C. to burn out the binder. Then, the component was sintered by heating the component at 5° C./minute from 1000° C. to 1344° C. and holding for 5 hours to form a densified transition layer comprising a mullite/BSAS mixture (80 vol % mullite and 20 vol % BSAS). The entire heat treatment was carried out in ambient conditions. The yttrium nitrate hexahydrate slurry sintering aid promoted densification of the transition layer to a porosity of less than 10% by volume.

Next, a primary outer material slurry was made by first mixing BSAS, water, polyacrylic acid, Surfynol 502®, and glycerin in a plastic container, along with enough 0.25 inch (6.35 mm) diameter, cylindrical alumina media to line the bottom of container. This mixture was placed on a roller mill for 15 hours. After taking the container off of the roller mill, the alumina media was removed. Xanthan gum was added and the mixture was shaken for 15 minutes using a paint shaker. Finally, Rhoplex® HA8 emulsion was added and the container was placed back onto the roller mill for 1 hour (without media).

The resulting primary outer material slurry (Slurry F) consisted of 57.07% BSAS, 2.85% polyacrylic acid, 0.12% Surfynol® 502, 0.19% xanthan gum, 7.34% Rhoplex® HA8 emulsion, 5.30% glycerin, and the balance water (all percents by weight). No sintering aid was added to Slurry F. The SiC—SiC CMC with bond coat and transition layer was dipped into Slurry F, dried in ambient conditions, and heat-treated at 3° C./minute to 1000° C. to burn out the binder. Then, the component was sintered by heating the component at 5° C./minute from 1000° C. to 1344° C. and holding for 5 hours to form a densified outer layer. The entire heat treatment was carried out in ambient conditions. In this case, residual sintering aid from the transition layer diffused into the outer layer to promote densification of the outer layer to a porosity of less than 10% by volume.

Figure 4:
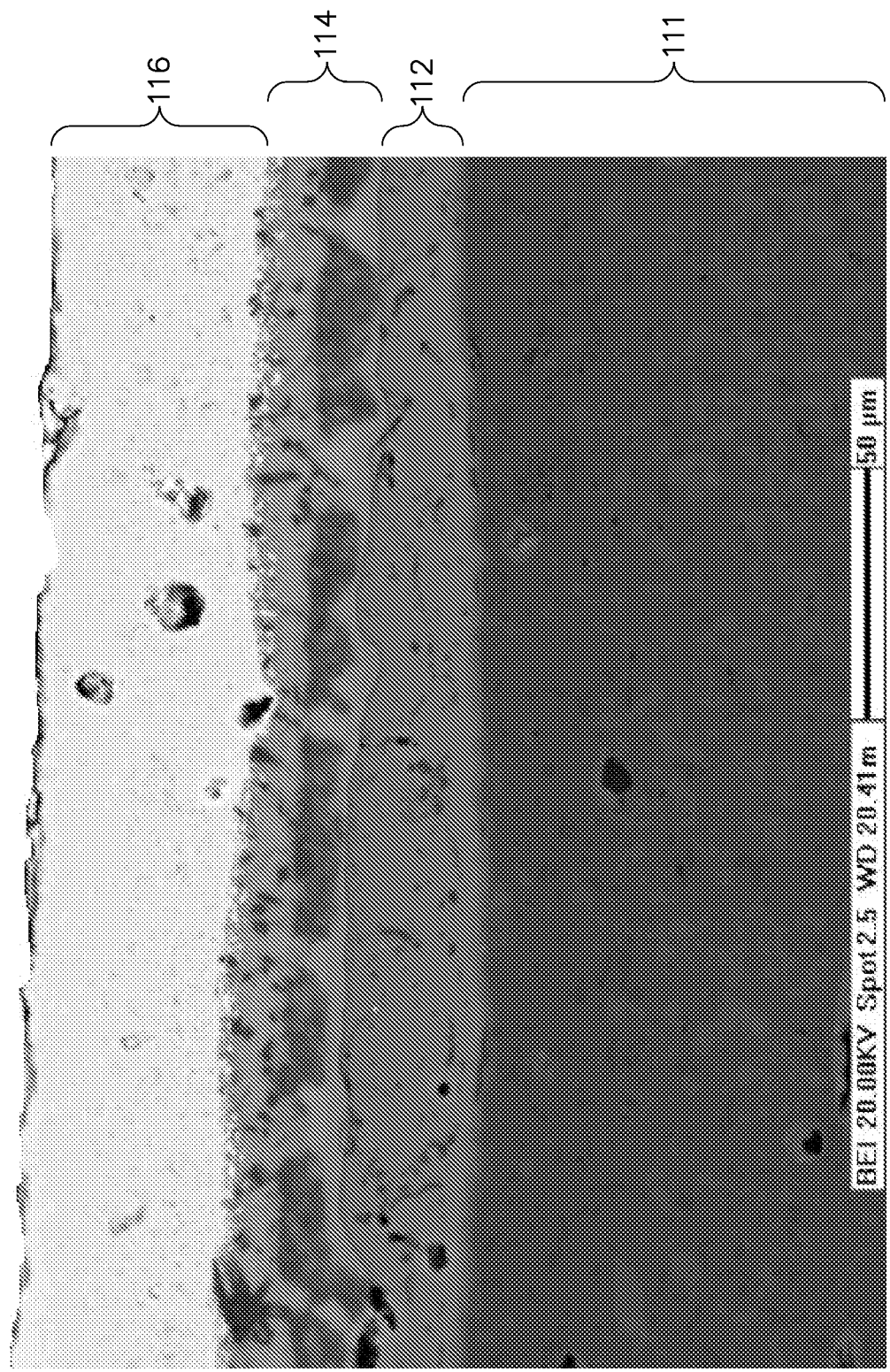
FIG. 4 is a SEM cross-section of an EBC coating on a SiC—SiC CMC in accordance with Example 3.

FIG. 4 shows a SEM micrograph of a CMC (111) having this coating microstructure with the air plasma spray silicon bond coat (112), transition layer (114), and outer layer (116). While the outer layer and transition layer appear to consist mainly of the primary materials (BSAS and mullite/BSAS mixture, respectively), x-ray diffraction suggested that there was a secondary material present, i.e., yttrium disilicate. Additionally, some glassy material had also formed in the transition layer due to the reaction between mullite and BSAS.

Example 4

A silicon bond coat was applied to a SiC—SiC CMC using a conventional air plasma spray process. Next, a primary transition material slurry was made by mixing mullite, BSAS, water, polyacrylic acid, Surfynol 502®, and glycerin in a plastic container, along with enough 0.25 inch (6.35 mm) diameter, cylindrical alumina media to line the bottom of container. This mixture was placed on a roller mill for 15 hours. After taking the container off of the roller mill, the alumina media was removed. Xanthan gum was then added and the mixture was shaken for 15 minutes using a paint shaker. Finally, Rhoplex® HA8 emulsion was added and the container was placed back onto the roller mill for 1 hour (without media).

The resulting primary transition material slurry (Slurry G) consisted of 40.68% mullite, 10.17% BSAS, 2.54% polyacrylic acid, 0.14% Surfynol® 502, 0.23% xanthan gum, 6.71% Rhoplex® HA8 emulsion, 4.92% glycerin, and the balance water (all percents by weight). No sintering aid was added to slurry G. The silicon-coated ceramic component was dipped into slurry G and dried in ambient conditions. Subsequently, the coated component was immersed in a sintering aid solution of 8 wt % yttrium methoxyethoxide (solvent soluble sintering aid) and 92 wt % ethyl alcohol (organic solvent) so that the sintering aid solution could flow into the pore space within the unfired coating. The ethyl alcohol evaporated under ambient conditions and the coated component was heat-treated at 3° C./minute to 1000° C. to burn out the binder. Then, the component was sintered by heating the component at 5° C./minute from 1000° C. to 1344° C. and holding for 5 hours to form a densified transition layer comprising a mullite/BSAS mixture (80 vol % mullite and 20 vol % BSAS) and having a porosity of less than 10% by volume.

Next a primary outer material slurry was made by mixing BSAS, water, polyacrylic acid, Surfynol 502®, and glycerin in a plastic container, along with enough 0.25 inch (6.35 mm) diameter, cylindrical alumina media to line the bottom of container. This mixture was placed on a roller mill for 15 hours. After taking the container off of the roller mill, the alumina media was removed. Xanthan gum was then added and the mixture was shaken for 15 minutes using a paint shaker. Finally, Rhoplex® HA8 emulsion was added and the container was placed back onto the roller mill for 1 hour (without media).

The resulting primary outer material slurry (Slurry H) consisted of 51.48% BSAS, 2.57% polyacrylic acid, 0.14% Surfynol® 502, 0.23% xanthan gum, 6.62% Rhoplex® HA8 emulsion, 4.86% glycerin, and the balance water (all percents by weight). No sintering aid was added to Slurry H. The SiC—SiC CMC with bond coat and transition layer was dipped into Slurry H and dried in ambient conditions. Subsequently, the coated component was immersed in a sintering aid solution of 8 wt % yttrium methoxyethoxide and 92 wt % ethyl alcohol so that the sintering aid solution could flow into the pore space within the unfired coating. After drying out the ethyl alcohol as described previously, the sample was heat-treated at 3° C./minute to 1000° C. to burn out the binder. Then, the component was sintered by heating the component at 5° C./minute from 1000° C. to 1344° C. and holding for 5 hours to form a densified outer layer having a porosity of less than 10% by volume. The entire heat treatment was carried out in ambient conditions.

Figure 5:
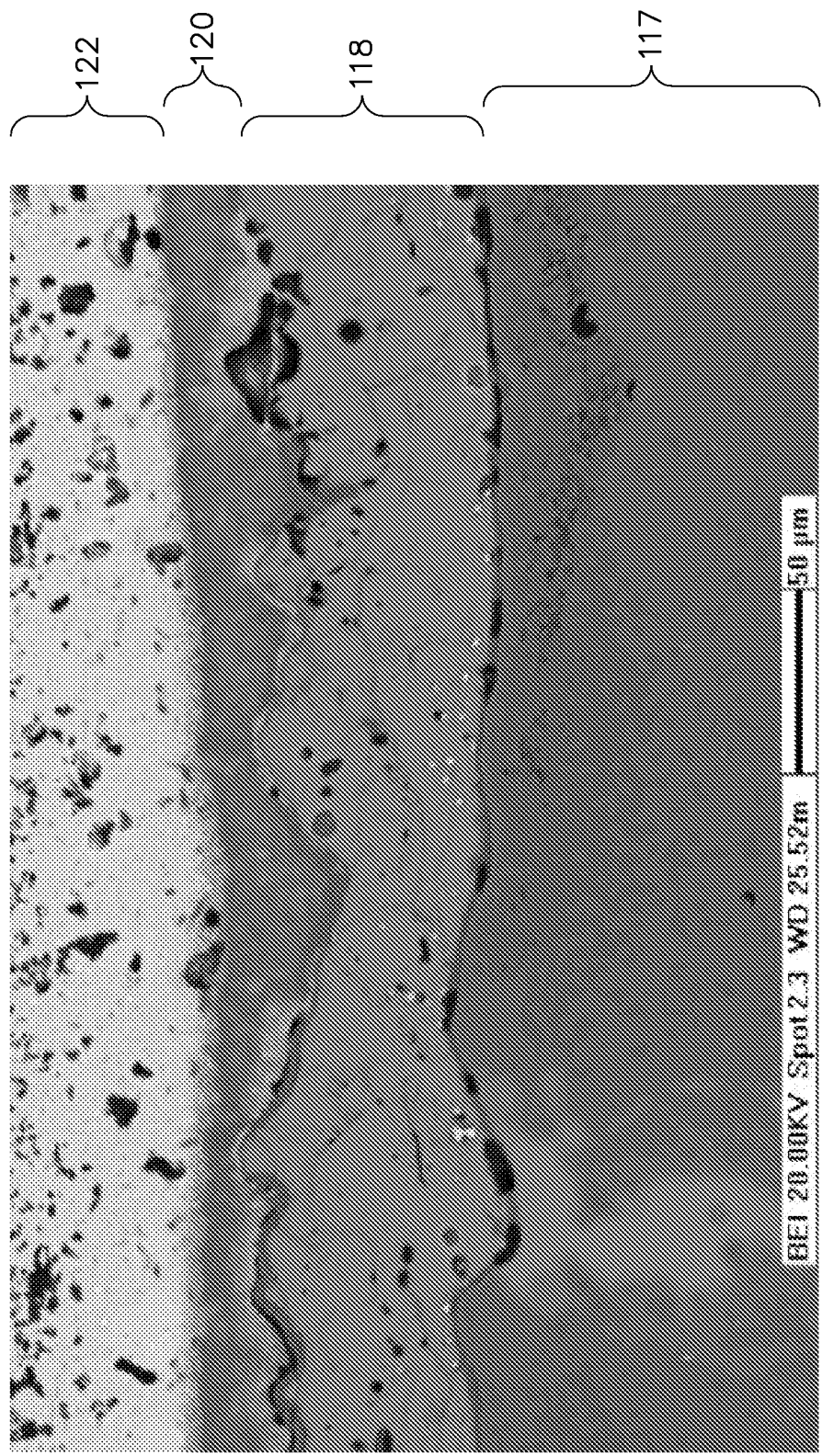
FIG. 5 is a SEM cross-section of an EBC coating on a SiC—SiC CMC in accordance with Example 4.

FIG. 5 shows a SEM micrograph of a CMC (117) having this coating microstructure with the air plasma spray silicon bond coat (118), mullite/BSAS transition layer (120), and the BSAS outer layer (122). While the BSAS outer layer and mullite/BSAS transition layer appear to consist mainly of the primary materials, x-ray diffraction suggested that there was a secondary material present, i.e., yttrium disilicate. Combined x-ray diffraction and EDS analysis suggested that there were small amounts of rare earth aluminosilicate glass and alkaline earth aluminosilicate glass secondary materials in the outer layer as well.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An environmental barrier coating comprising:
   at least one transition layer made from a transition layer slurry composition comprising:
      water;
      a primary transition material; and
      a first slurry sintering aid in an amount that exceeds solubility of the first slurry sintering aid in the primary transition material so that the amount of the first slurry sintering includes an insoluble portion; and
   an outer layer made from an outer layer slurry composition comprising:
      water;
      a primary outer material; and
      a second slurry sintering aid in an amount that exceeds solubility of the second slurry sintering aid in the primary outer material so that the amount of the second slurry sintering aid includes an insoluble portion,
   wherein the primary transition material is selected from the group consisting of mullite, BSAS, and a mullite/BSAS mixture, and the primary outer material comprises BSAS, and
   wherein the transition layer consists of the primary transition material, any of the first slurry sintering aid dissolved therein, and a first secondary material as a reaction product of the primary transition material and the insoluble portion of the first slurry sintering aid, the outer layer consists of the primary outer material, any of the second slurry sintering aid dissolved therein, and a second secondary material as a reaction product of the primary outer material and the insoluble portion of the second slurry sintering aid, the first and second slurry sintering aids increase rates of diffusion of, respectively, the primary transition material and the primary outer material such that surface area reduction occurs within the transition layer and the outer layer at lower temperatures than would occur absent the first and second slurry sintering aids, and the first and second secondary materials are chosen from the group consisting of rare earth oxides, rare earth disilicates, rare earth monosilicates, rare earth elements, rare earth containing aluminosilicate glasses, rare earth and alkaline earth containing aluminosilicate glasses, rare earth aluminates, phosphorous pentoxide, phosphorous containing aluminosilicate glasses, phosphorous and alkaline earth containing aluminosilicate glasses, aluminum orthophosphate, aluminum oxide, and combinations thereof.

2. The coating of claim 1, wherein the transition layer comprises a thickness of about 2.5 to about 150 micrometers, and the outer layer comprises a thickness of about 2.5 to about 100 micrometers.

3. The coating of claim 1, wherein the first and second secondary materials contain at least one of the rare earth disilicates and rare earth monosilicates.

4. The coating of claim 1, wherein the environmental barrier coating is on a component formed of a ceramic matrix composite material or a monolithic ceramic material and the component is selected from the group consisting of combustor components, turbine blades, shrouds, nozzles, heat shields, and vanes.

5. An environmental barrier coating comprising:
a bond coat layer comprising silicon;
a silica layer;
at least one transition layer made from a transition layer slurry composition comprising:
from about 9 wt % to about 81 wt % water;
from about 3 wt % to about 72 wt % of a primary transition material; and
a first slurry sintering aid in an amount that exceeds solubility of the first slurry sintering aid in the primary transition material so that the amount of the first slurry sintering aid includes an insoluble portion; and
an outer layer made from a slurry composition comprising:
from about 9 wt % to about 81 wt % water;
from about 3 wt % to about 72 wt % of a primary outer material; and
a second slurry sintering aid in an amount that exceeds solubility of the second slurry sintering aid in the primary outer material so that the amount of the second slurry sintering aid includes an insoluble portion;
wherein the transition layer comprises a porosity of from about 0.01% to about 30% by volume of the transition layer, and the outer layer comprises a porosity of from about 0.01% to about 15% by volume of the outer layer, and
wherein the first and second slurry sintering aids are selected from the group consisting of rare earth nitrate, rare earth acetate, rare earth chloride, rare earth oxide, ammonium phosphate, phosphoric acid, polyvinyl phosphonic acid, and combinations thereof, and
wherein the primary transition material is selected from the group consisting of mullite, BSAS, and a mullite/BSAS mixture, and the primary outer material comprises BSAS, and
wherein the transition layer consists of the primary transition material, any of the first slurry sintering aid dissolved therein, and a first secondary material as a reaction product of the primary transition material and the insoluble portion of the first slurry sintering aid, the outer layer consists of the primary outer material, any of the second slurry sintering aid dissolved therein, and a second secondary material as a reaction product of the primary outer material and the insoluble portion of the second slurry sintering aid, the first and second slurry sintering aids increase rates of diffusion of, respectively, the primary transition material and the primary outer material such that surface area reduction occurs within the transition layer and the outer layer at lower temperatures than would occur absent the first and second slurry sintering aids, and the first and second secondary materials are chosen from the group consisting of rare earth disilicates, rare earth monosilicates, rare earth aluminates, and combinations thereof.

6. The coating of claim 5 wherein the first and second secondary materials contain at least one of the rare earth disilicates and rare earth monosilicates.

7. The coating of claim 5, wherein the transition layer comprises a thickness of about 2.5 to about 150 micrometers, and the outer layer comprises a thickness of about 2.5 to about 100 micrometers.

8. The coating of claim 5, wherein the environmental barrier coating is on a component formed of a ceramic matrix composite material or a monolithic ceramic material and the component is selected from the group consisting of combustor components, turbine blades, shrouds, nozzles, heat shields, and vanes.

\* \* \* \* \*